(12) United States Patent
Wang

(10) Patent No.: US 7,683,739 B2
(45) Date of Patent: Mar. 23, 2010

(54) SIGNAL FILTER ASSEMBLY WITH IMPEDANCE-ADJUSTING CHARACTERISTIC

(75) Inventor: Chang-Ping Wang, Taipei (TW)

(73) Assignee: Sure-Fire Electrical Corporation, Taipei Hsien (TW)

( * ) Notice: Subject to any disclaimer, the term of this patent is extended or adjusted under 35 U.S.C. 154(b) by 1310 days.

(21) Appl. No.: 11/160,359

(22) Filed: Jun. 21, 2005

(65) Prior Publication Data

US 2006/0285620 A1 Dec. 21, 2006

(51) Int. Cl.
*H03H 7/00* (2006.01)

(52) U.S. Cl. ........................ 333/172; 333/182; 333/185

(58) Field of Classification Search ............... 333/32, 333/167, 168, 170, 171, 172, 174, 175, 182, 333/185, 260; 439/581; 327/555; 348/607; 725/127

See application file for complete search history.

(56) References Cited

U.S. PATENT DOCUMENTS

| 4,319,207 | A * | 3/1982 | Gignoux | 333/173 |
| 6,617,939 | B1 * | 9/2003 | Vermeersch | 333/28 R |
| 6,888,423 | B2 * | 5/2005 | Tresness et al. | 333/185 |

* cited by examiner

*Primary Examiner*—Robert Pascal
*Assistant Examiner*—Kimberly E Glenn

(57) ABSTRACT

Disclosed is a signal filter assembly, which includes a circuit board electrically connected between a cable and a high frequency electric connector, and a plurality of filters installed in the circuit board and respectively electrically connected to the signal wires of the transmission wires of the cable, each filter being formed of a parallel circuit of a resistor and a capacitor.

2 Claims, 6 Drawing Sheets

SIGNAL FILTER ASSEMBLY WITH IMPEDANCE-ADJUSTING CHARACTERISTIC

BACKGROUND OF THE INVENTION

1. Field of the Invention

The present invention relates to signal filter means for use between a cable and a high frequency electric connector and more particularly, to a signal filter assembly, which uses filters each formed of a parallel circuit of one resistor and one capacitor to automatically adjust the impedance between the cable and the high frequency electric connector, and which attenuates the voltage level to keep the high frequency level and the low frequency level equal.

2. Description of the Related Art

There is a great change in audio and video applications in recent years, and many high-tech video apparatus and systems such as disc player, high-resolution digital TV, videophone, video conference system, and etc., have entered outer life. Comparing to conventional techniques, these high-tech video apparatus and system process video signal in a digital form. Following the demand for application in different fields, related standards have been established and modified to a perfect state. In order to let users enjoy better quality, suppliers are trying hard to increase the bandwidth of digital signal so as to provide better picture quality and sound quality.

However, following the increase of system working frequency and the miniaturization of electronic devices, related electric connectors are made relatively smaller. In consequence, a greater level of high frequency noise is produced due to non-match of impedance. Various factors including line width, material thickness, copper foil thickness, material's coefficient of dielectric constant, solder mask, etch factor, and etc. cause the occurrence of noise. Crosstalk is the most common problem. Crosstalk is produced upon interference of the magnetic waves from a dynamic signal with the neighbor signal line. This problem becomes more serious during the transmission of a high frequency. The crosstalk between two signals is subject to the relative capacitance value and inductance value. Normally, the crosstalk caused by the inductance is more serious than the crosstalk caused by the inductance in digitalization. A crosstalk will cause the following effects.

a. Variation of equivalent characteristic impedance.
b. Variation of transmission speed.
c. Incomplete of signal.
d. Lowering of noise margin.

Further, the cable is also an important factor that affects the crosstalk. In order to transmit a signal to a farther place, the length of the cable must be relatively increased. However, extending the length of the cable will relatively increase the crosstalk. When using a better cable in order to reduce the crosstalk, the installation cost is relatively increased.

Further, in early days, CRT monitors were commonly used in TV and computer systems for the advantages of good quality and low price. Nowadays, various planar displays including TFT LCD and PDP have been developed and have appeared on the market. These planar displays are developed to provide a better picture quality. In order to obtain a better picture quality, digitalization is employed to process image noises. For a better picture quality, a broad bandwidth is required. In consequence, the crosstalk will be relatively increased. If a transmission line is used to transmit a high frequency signal to an electronic product (TV, LCD) directly without considering the problem of crosstalk, the crosstalk will affect the quality of the picture, resulting in edge blur and unclearness of layering. Thus, it is not possible to obtain a better picture quality.

SUMMARY OF THE INVENTION

The present invention has been accomplished under the circumstances in view. It is the main object of the present invention to provide a signal filter assembly for connection between a cable and a high frequency electric connector which attenuates the voltage level, keeping the level of the high frequency signal and the level of the low frequency signal, and, which automatically adjusts the impedance subject to the length of the cable.

To achieve this and other objects of the present invention, the signal filter assembly comprises a circuit board, which comprises a plurality of transmission circuits arranged on top and bottom surfaces thereof and electrically connected between a cable and a high frequency electric connector, and a plurality of filters installed in the transmission circuits of the circuit board for filtering a high frequency signal passing from the cable to the high frequency electric connector through the transmission circuits of the circuit board. The cable comprises a plurality of transmission wires, which include a plurality of signal wires and at least one grounding wire. The filters are respectively electrically connected to the signal wires of the transmission wires of cable, each comprising a resistor and a capacitor connected in parallel.

DETAILED DESCRIPTION OF THE PREFERRED EMBODIMENT

Figure 1:
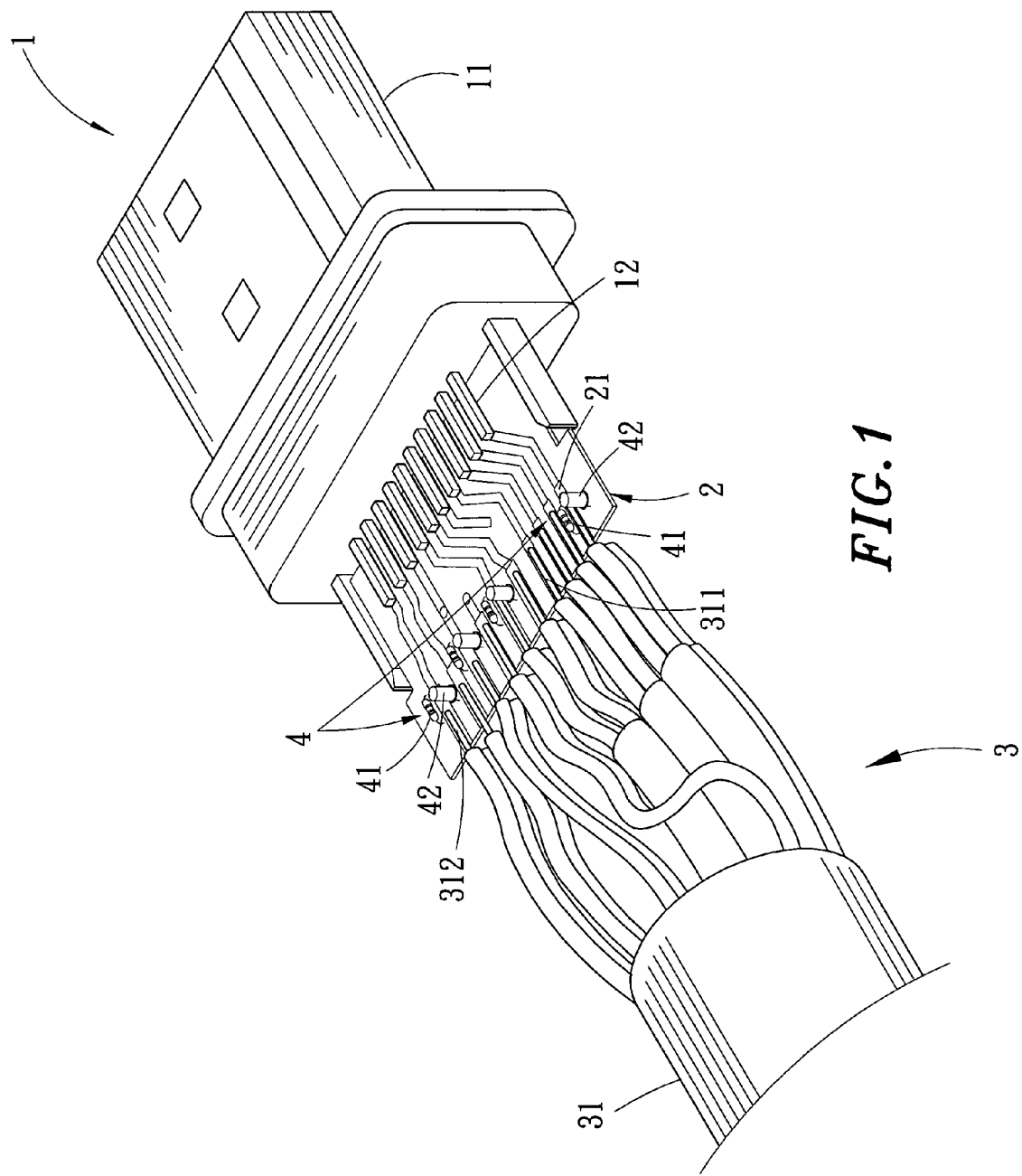
FIG. 1 is a perspective view of the preferred embodiment of the present invention.
Figure 2:
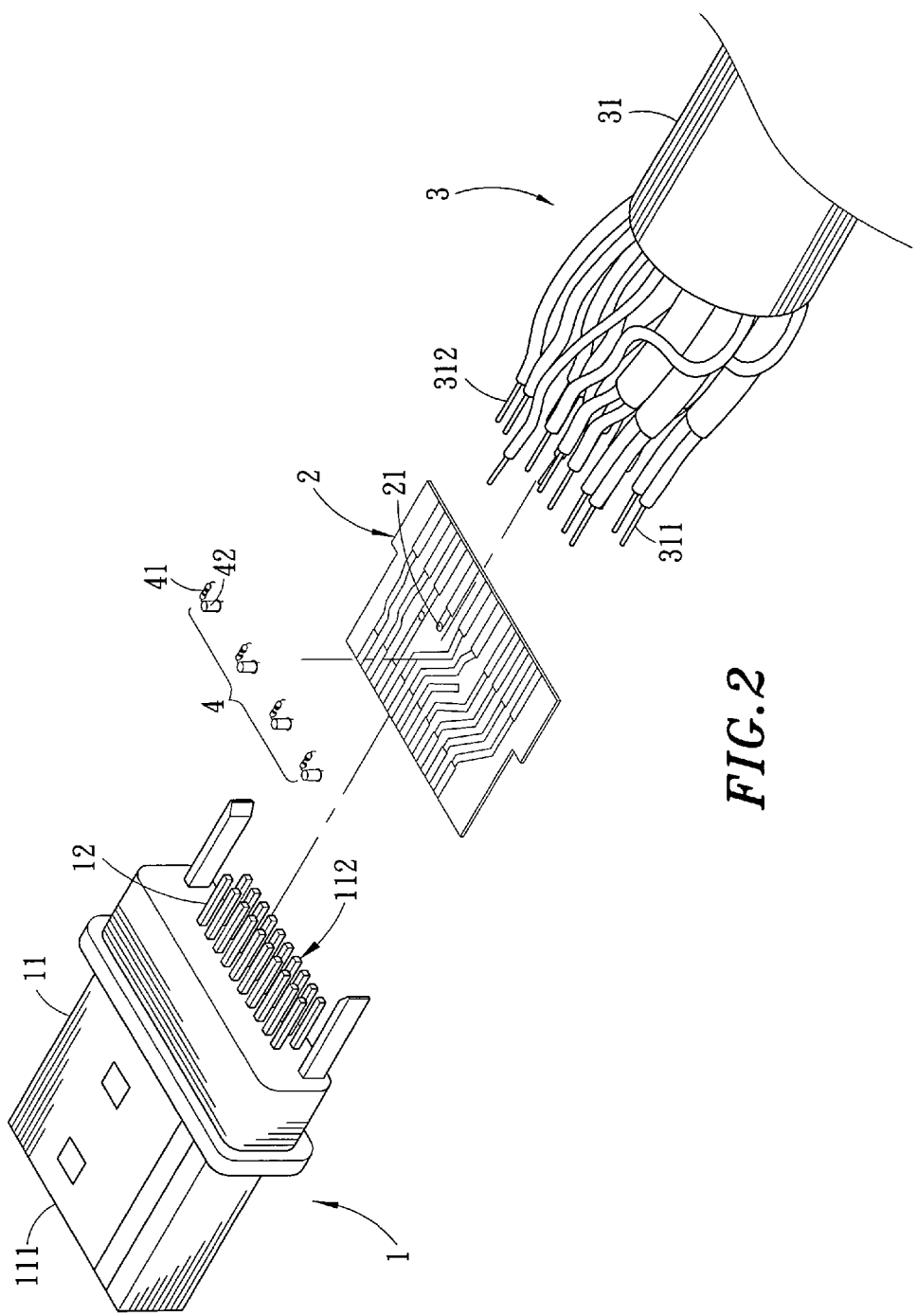
FIG. 2 is an exploded view of the preferred embodiment of the present invention.

Referring to FIGS. 1 and 2, a signal filter assembly in accordance with the present invention is shown comprised of a circuit board 2 and filters 4, and electrically connected between a high frequency electric connector 1 and a cable 3.

The high frequency electric connector 1 comprises a housing 11 and a set of terminals 12. The housing 11 has a receiving side 111 for the connection of an electronic device, and a bonding side 112 opposite to the receiving side 111. The terminals 12 are mounted inside the housing 11 and arranged in two rows at different elevations, each having one end extending out of the bonding side 112.

The circuit board 2 has transmission circuits 21 on the top and bottom surfaces thereof. The circuits 21 have one side connectable to the high frequency electric connector 1 and the other side connectable to the cable 3.

The cable 3 comprises a plurality of transmission wires 31, which include signal wires 311 and a grounding wire 312.

The filters 4 are mounted on the transmission circuits 21 of the circuit board 2 and electrically connected between the signal wires 311 of the cable 3 and the terminals 12 of the high frequency electric connector 1, each comprising a resistor 41 and a capacitor 42. The resistor 41 and the capacitor 42 are arranged in parallel.

During installation, the circuit board 2 is set in between the two vertically spaced rows of terminals 12 at the bonding side 112 of the high frequency electric connector 1, and then the terminals 12 are respectively soldered to one end of each of the transmission circuits 21 of the circuit board 2, and then the other end of each of the transmission circuits 21 of the circuit board 2 is respectively electrically connected to the cable 3, thereby finishing the assembly procedure of the present invention.

Figure 3:
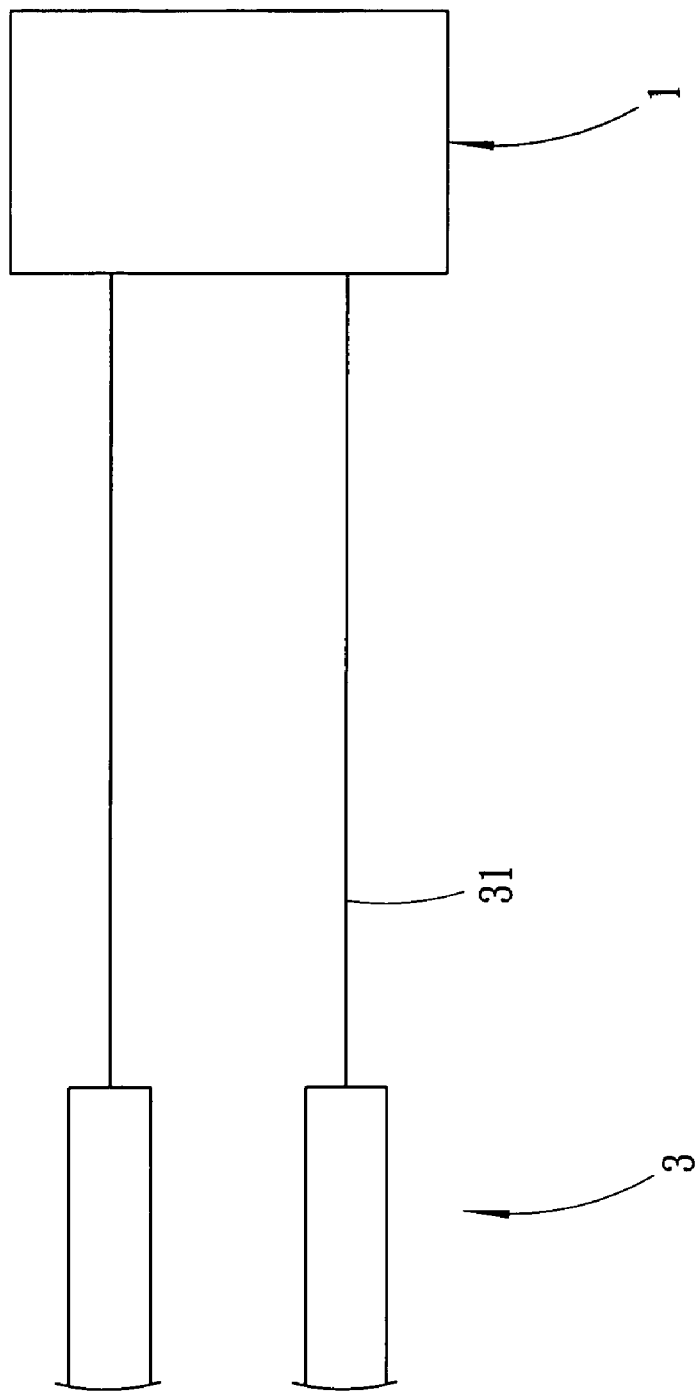
FIG. 3 is a schematic drawing of a high frequency transmission line without signal filter assembly.
Figure 3A:
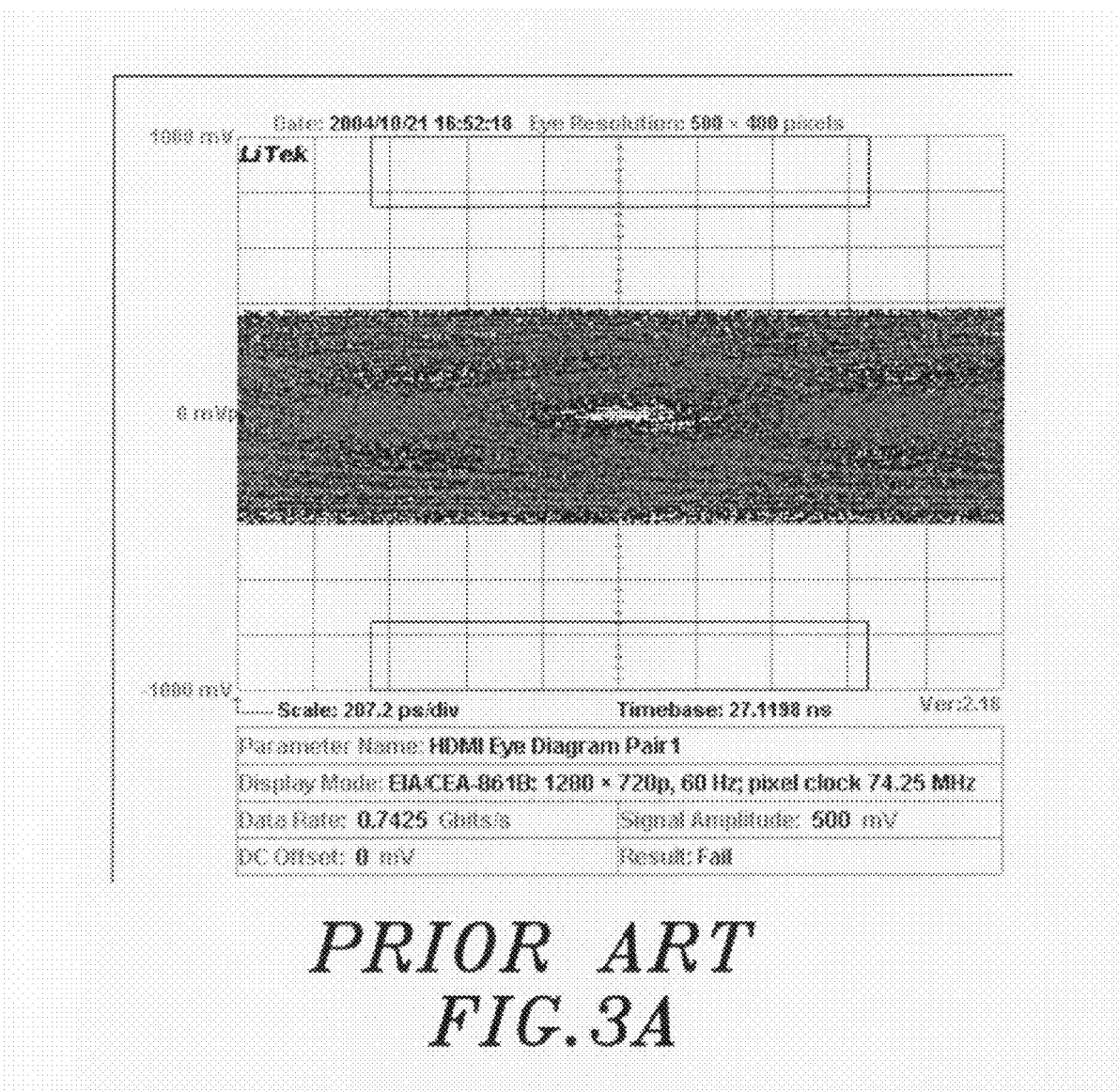
FIG. 3A is a waveform chart obtained from the high frequency transmission line shown in FIG. 3.

FIG. 3 is a schematic drawing of a high frequency transmission line without signal filter assembly according to the prior art. FIG. 3A is a waveform chart obtained from the high frequency transmission line shown in FIG. 3. As illustrated, during the transmission of a high frequency signal through the transmission wires 31 of the cable 3, an interference is produced between each two adjacent transmission wires 31, and the high frequency electric connector 1 may be unstable to receive the signal in whole.

Figure 4:
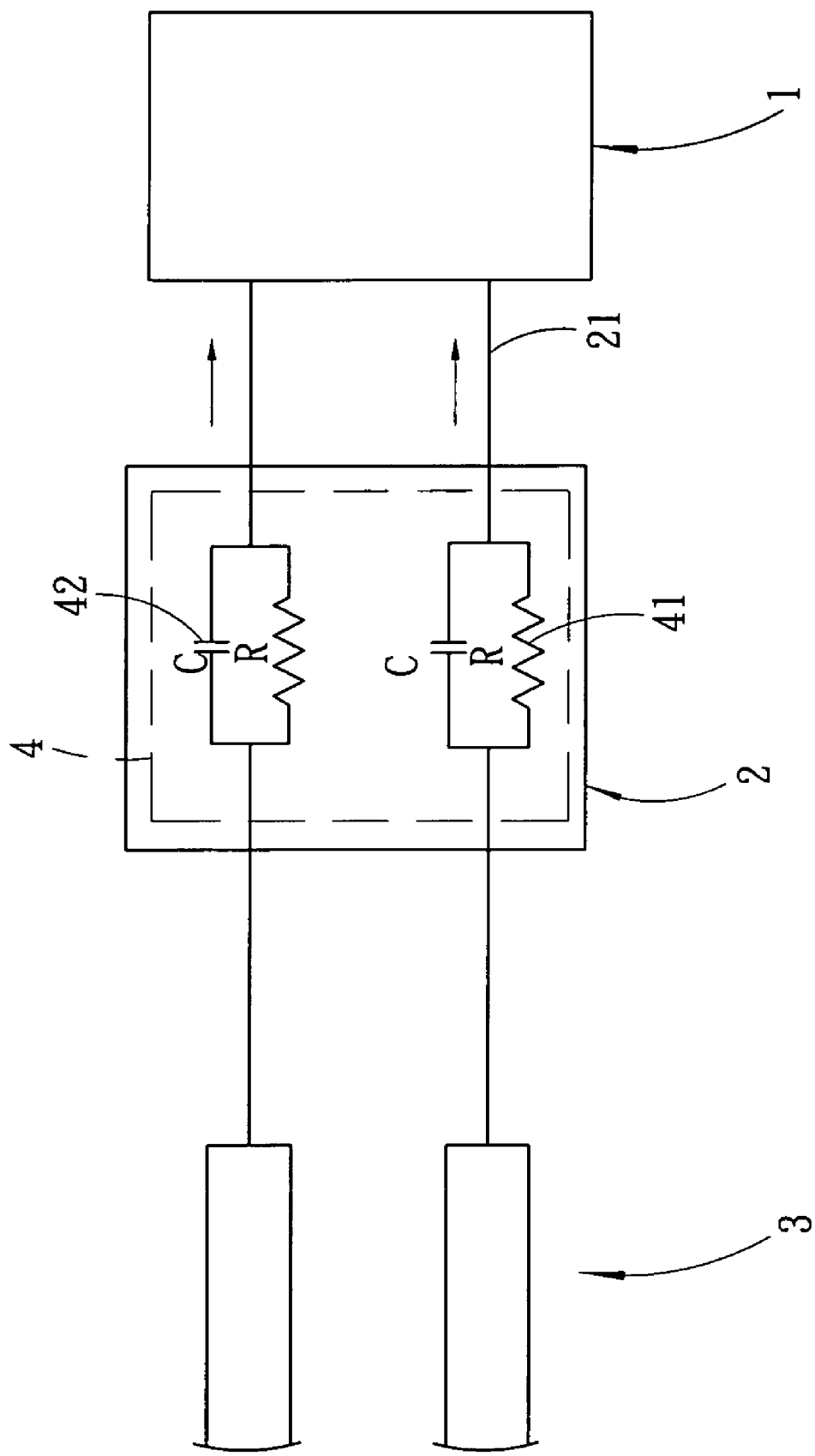
FIG. 4 is a schematic drawing of a high frequency transmission line with a signal filter assembly according to the present invention.
Figure 4A:
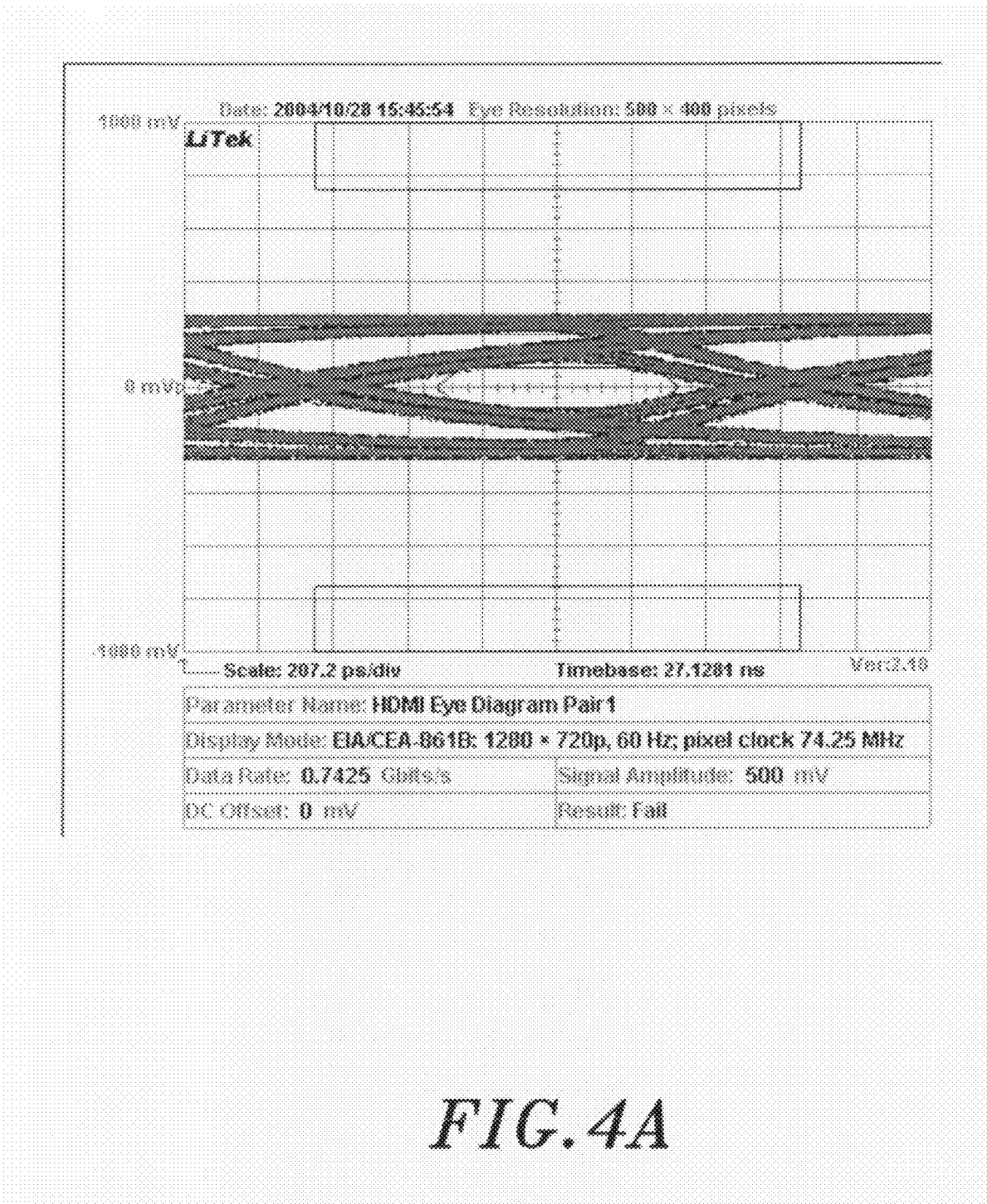
FIG. 4A is a waveform chart obtained from the high frequency transmission line shown in FIG. 4.

Referring to FIGS. 4 and 4A, after installation of the signal filter assembly in between the cable 3 and the high frequency electric connector 1, the filters 4 at the circuit board 2 use the respective parallel circuit of resistor 41 and capacitor 42 to adjust the impedance and to further lower the voltage level to the range within which the high frequency signal is receivable, so that the high frequency level and the low frequency level in the digital signal are maintained equal. At this time, the signal is accurately transmitted through the transmission circuits 21 of the circuit board 2 to the high frequency electric connector 1, and then accurately transmitted from the high frequency electric connector 1 to the connected electronic device for output through the display screen of the electronic device, and therefore the user can see the picture clearly. By means of the use of the signal filter assembly, the length of the cable 3 can be extended to fit the requirement without causing interference.

Further, during the transmission of a high frequency signal to an electronic apparatus, the whole inductance must be taken into account. If the impedance of the resistor 41 and the capacitor 42 does not match, the problems of signal attenuation and crosstalk will occur. Therefore, the whole characteristic impedance of the circuit board 2 must be close or equal to the characteristic impedance of the cable 3. When changing the length of the cable 3, the characteristic impedance of the cable 3 is relatively changed. At this time, the parallel circuit of the resistor 41 and capacitor 42 of each filter 4 at the circuit board 2 adjust the adapter's characteristic impedance, keeping the characteristic impedance of the circuit board 2 in match with the characteristic impedance of the cable 3. Therefore, the invention effectively eliminates the problems of signal attenuation and crosstalk.

As indicated above, the present invention provides a signal filter assembly between a cable and a high frequency electric connector, which uses the characteristic of the parallel circuit of the resistor and capacitor of each filter at the circuit board of being capable of adjusting the characteristic impedance between the cable and the high frequency electric connector to lower the voltage level to the range capable of receiving a high frequency signal so that the high frequency level and the low frequency level in the digital signal are maintained equal. Thus, the high frequency electric connector can receive the high frequency signal clearly accurately. Because the filters can adjust the characteristic impedance subject to the length of the cable, there is no strict limitation to the length of the cable, and the invention eliminates the problem of crosstalk due to a wide broadband. Therefore, no margin blur will occur during the display of the signal. When the high frequency signal is outputted through the display screen of an electronic apparatus (TV or LCD), a high quality picture is shown.

Although a particular embodiment of the invention has been described in detail for purposes of illustration, various modifications and enhancements may be made without departing from the spirit and scope of the invention.

What is claimed is:

1. A signal filter assembly comprising a circuit board, said circuit board comprising a plurality of transmission circuits arranged on top and bottom surfaces thereof and electrically connected between a cable and a high frequency electric connector, and a plurality of filters installed in said transmission circuits of said circuit board for filtering a high frequency signal passing from said cable to said high frequency electric connector through said transmission circuits of said circuit board, said cable comprising a plurality of transmission wires, said transmission wires including a plurality of signal wires and at least one grounding wire, wherein said filters are respectively electrically connected to the signal wires of the transmission wires of said cable, each comprising a resistor and a capacitor connected in parallel.

2. The signal filter assembly as claimed in claim 1, wherein said high frequency electric connector is electrically connectable to a television set.

* * * * *